United States Patent [19]

Challoner et al.

[11] Patent Number: 5,383,359
[45] Date of Patent: Jan. 24, 1995

[54] DETERMINING LIQUID FILL FRACTION ON A SPACECRAFT

[75] Inventors: A. Dorian Challoner, Manhattan Beach; Arthur C. Or, Los Angeles, both of Calif.

[73] Assignee: Hughes Aircraft Company, Los Angeles, Calif.

[21] Appl. No.: 984,146

[22] Filed: Dec. 2, 1992

[51] Int. Cl.⁶ .............................................. G01F 23/22
[52] U.S. Cl. .................................. 73/290 R; 364/509; 364/564; 340/870.16
[58] Field of Search .............. 73/290 R, 291; 364/509, 364/564; 340/870.16, 618

[56] References Cited

U.S. PATENT DOCUMENTS

| 4,898,030 | 2/1990 | Yeh | 73/290 R X |
| 4,908,776 | 3/1990 | Crill et al. | 73/290 R X |

Primary Examiner—Diego F. F. Gutierrez
Attorney, Agent, or Firm—William J. Streeter; Wanda K. Denson-Low

[57] ABSTRACT

A method and apparatus of determining the fill fraction of a liquid in a spacecraft in weightless space is disclosed. A small motion is introduced about the center of mass of the spacecraft undergoing steady spin and/or thrust, and resulting spacecraft oscillations are sensed. The measured frequency, amplitude and phase of the spacecraft oscillations are compared with counterpart values predicted for possible liquid quantities by a nonempirically computed model of spacecraft dynamics.

18 Claims, 3 Drawing Sheets

DETERMINING LIQUID FILL FRACTION ON A SPACECRAFT

TECHNICAL FIELD

The present invention is related to a method of determining the fill fraction of a liquid in a cavity of a spacecraft.

BACKGROUND ART

There are several methods known in the art for determining the fill fraction of a liquid in a container. For example, shaking a container of liquid by hand is a commonly used method to approximate the amount of liquid therein. This method is an empirical method since the method relies or is based solely on experiments or experience or is based on practical experience without reference to scientific principles. More accurate methods exist for measuring the container fill fraction. For example, a container supported by load cells could be filled with accurately measured quantities of liquid and vibrated over a known range of frequencies. This could establish liquid sloshing frequencies versus fill fraction or height of a liquid in the container.

Several other systems and methods for measuring the quantity of liquid in a container have been developed. U.S. Pat. No. 4,788,648, issued to Ferretti et al., discloses a method and system for measuring liquid level in a tank which determines values of differential pressure within the tank and, in accordance with the values of the differential pressure, calculates the instantaneous level of substance within tank. U.S. Pat. No. 4,815,323, issued to Ellinger et al., discloses an aircraft fuel quantity gauging method which uses ultrasonic signals. U.S. Pat. No. 4,901,245, issued to Olson et al., discloses a nonintrusive acoustic liquid level sensor system and method for detecting the level of a liquid in a tank. Also, U.S. Pat. No. 4,908,776, issued to Crill et al., discloses an apparatus and method for spacecraft fuel measurement which utilizes an accelerometer mounted proximal to the tank to measure sloshing of fuel in response to forces acting on the spacecraft. The actual amount of fuel remaining in the tank is estimated by comparing the measured frequency of oscillation with empirical data linking the frequency of oscillation with the amount of remaining fuel. The accuracy of this empirical method, however, is uncertain due to the effects of the gravitation acceleration (i.e., 32 ft/S$^2$) and the mechanical constraints supporting the spacecraft, both of which are absent in orbit.

Other systems and methods are found in other patents, such as U.S. Pat. Nos. 4,908,783, 4,928,525 and 4,977,528.

An advantage of a systematic or theoretical model of prediction versus the empirical models is the elimination of expensive tests, measurement or calibration prior to use. Also, the accuracy of an empirical method based on ground testing is in doubt as previously noted.

One type of systematic method for predicting small amplitude slosh frequencies versus fill fractions for a more or less incompressible liquid that is not spinning in a uniform gravity field is to solve Laplace's equation with appropriate boundary conditions at the tank wall and free surface. At the tank wall, the liquid velocity normal to the wall must be zero and, at the free surface, the pressure must be constant and equal to the pressure of gas in the tank. A solution to this well known boundary condition problem can be obtained analytically for certain tank shapes, e.g., cylindrical, or by numerical methods, e.g., finite element analysis, for general geometries.

An equivalent pendulum model of the liquid can be deduced from this theory and can be used to accurately predict the sloshing forces on the container, provided it is not rotating. Using any one of a number of mechanical theories for multirigid body systems, this mechanical pendulum analog may be attached to a rigid body model of the container to predict the response of the overall container-liquid system. Such a model, which has been previously applied to determine the stability of rocket flight control systems, could also be used in the determination of fuel remaining.

When the container is rotating, equivalent pendulum models cannot completely describe the liquid behavior; and the general coupled system response is not obvious. Theoretical models treating the spinning, coupled, spacecraft-liquid system have so far been limited to predicting passive spacecraft stability at a single frequency (i.e., spacecraft nutation frequency). In addition, these methods are limited to on-axis cylindrical or axisymmetric tanks, are used in approximate Fourier expansion methods, or are highly inaccurate compared with air bearing tests.

SUMMARY OF THE INVENTION

It is an object of the present invention to provide a precise and efficient determination of liquid fill fraction in a cavity of a spacecraft utilizing a systematic, nonempirical method.

In carrying out the above and other objects of the present invention, an apparatus is provided for determining the volume of a liquid contained within at least one rigid tank disposed within a spacecraft. The spacecraft has an axis of rotation, and the tanks are rigidly disposed axisymmetrically on a platform that is rotatable within the spacecraft. To simplify the description of the present invention, however, the tanks are considered to be mounted on the spacecraft, which is rotating about its axis.

Thrusters are also disposed axisymmetrically so that, when actuated together, they impart a combined thrust that tends to accelerate the spacecraft along its axis for station-keeping position adjustments. When one is actuated alone, it imparts a thrust that axially translates and rotates the spacecraft about its center of mass for attitude adjustments. The thrusters produce only a relatively small acceleration, which results in the creation of a small oscillation about the position of equilibrium of the liquid. Being rigidly disposed therein, the oscillation is also imparted to the tanks and spacecraft.

An accelerometer is disposed on the spacecraft to measure the axial components of constituent oscillations resulting from the small acceleration. A solar sensor is also disposed on the spacecraft for sensing the presence of sunlight and thus each rotation of the spacecraft. A spacecraft telemetry system transmits data from the accelerometer and the solar sensor to a ground station telemetry system via a downlink signal.

A sharp, low-pass filter communicates the downlink signal to a dynamic signal analyzer, which analyzes the axial oscillation components measured by the accelerometer to determine the frequency, amplitude and phase of each of the oscillation signal constituents.

The apparatus also includes a computer for nonempirically predicting, according to a computed model of spacecraft dynamics and for a number of quantities of liquid storable in the tanks over a range of interest, the frequencies, amplitudes and phases of constituent oscillations that would be generated by the relatively small accelerations induced by the thruster about the center of mass of the spacecraft. The frequencies, amplitudes and phases determined by the dynamic signal analyzer are compared with those predicted by the computer to estimate the amount of liquid remaining in the tanks.

The advantages accruing to the method of the present invention are numerous. For example, the predicted response does not have to be empirically determined by a ground test of the spacecraft prior to launch. Errors introduced by ground versus space environment are therefore avoided. Additionally, an accurate determination of the remaining quantity of a liquid, such as a propellant, in a spacecraft allows the useful life of the spacecraft to be maximized.

The foregoing objects and other objects and advantages of the present invention are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
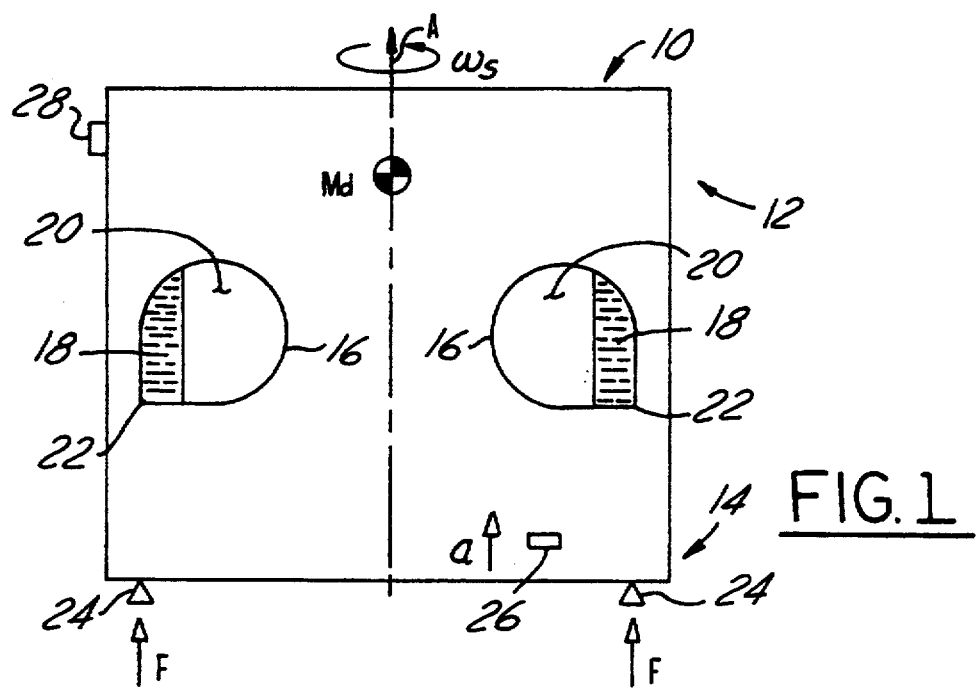
FIG. 1 is a sectional side elevation of a portion of a spacecraft wherein are mounted liquid storage tanks.

FIG. 1 of the drawings is a sectional side view of a portion, generally indicated by reference numeral 10, of a spacecraft having a forward end 12 in the direction of launch thrust, a rearward end 14 and an axis of rotation A. Four rigid tanks be (only two of which are shown), each having a cavity defined therein for storing a liquid be, are rigidly disposed axisymmetrically within the portion 10.

In the embodiment being described, the tanks 16 are mounted on a platform that is rotatable within the portion 10 of the spacecraft; but, for simplicity, the tanks 16 are shown mounted to the portion 10 of the spacecraft, which is considered to be spinning at an angular velocity $\omega_s$ in a range of 45 to 65 revolutions per minute and preferably at 55 revolutions per minute. The actual rotatable platform produces no relative motion in the axial direction, but the platform mass is included in the total spacecraft mass for the purpose of various spacecraft dynamic calculations. To simplify the illustration, only two of the tanks 16 are shown.

Although the tanks 16 can be used to store a number of different liquids 18, for the purpose of this discussion, the liquid stored is presumed to be hydrazine propellant, which has a density and a viscosity approximately equal to those of water. In addition to the liquid 18, each tank 16 includes therein an ullage volume 20, which is filled with helium gas initially pressurized to approximately 300 pounds per square inch. As hydrazine propellant is used, the helium expands and its pressure decreases proportionally.

As shown, each of the tanks 16 has a conispherical configuration and is disposed so that the apex 22 of its conic section is oriented away from the axis of rotation A and toward the rearward end 14 of the spacecraft. Such an orientation causes radially directed centrifugal force and/or forwardly directed thrust to force the contained liquid 18 against the apex 22 of the conic section of the tank 16, from which it can be released without releasing ullage gas. In FIG. 1, the liquid 18 is shown undergoing centrifugal acceleration force generated by the rotation of the spacecraft and a slight axial acceleration due to the application of both thrusters. In the embodiment being described, with empty tanks 16, the spacecraft weighs approximately 1,000 pounds. Allowing for no ullage volume, the hydrazine in four tanks 16 would represent approximately 364 pounds of additional mass. Due to tank disposition symmetry, interconnection for equal usage, and the relative lack of wobble, the fill fraction of any one of the tanks 16 remains the same as the fill fraction of any other one of the tanks 16.

A pair of axial thrusters 24 are rigidly disposed axisymmetrically on the spacecraft, as represented by FIG. 1. For convenience, means for communicating the liquid 18 from the tanks 16 to the axial thrusters 24 are not shown, but would include tubing and control valves well known by those skilled in the art. Acceleration along the axis of rotation A, for example, for station-keeping maneuvers, is provided by actuating both axial thrusters 24 simultaneously. An attitude maneuver is accomplished by actuating one axial thruster 24 for a brief period and at a specific angular disposition during each of one or more rotations of the spacecraft.

Thrust is provided by the expulsion of the liquid 18 caused by axial thruster 24, the amount of thrust produced being proportional to the remaining pressure of the ullage gas and decreasing from about 5 pounds to 1 pound of force as ullage volume 20 increases. For a typical station-keeping maneuver, both axial thrusters 24 are actuated for about one minute, during which time from 2 to 3 pounds of propellant mass is expelled. For a typical attitude correction maneuver, the actuation period of the axial thruster 24 involved is about 117 milliseconds for each of about 10 revolutions of the spacecraft.

An accelerometer 26 is mounted on the spacecraft to measure acceleration a parallel to the axis of rotation A and to generate an oscillation signal representative thereof. The accelerometer 26 used on the disclosed embodiment is a commonly available analog servo type having a negligible resolution limit less than 1 micro-g, a sensitivity in the range of 3 to 10 volts per g (preferably 5 volts per g) and a bandwidth of 0 to 60 Hertz (preferably 0 to 40 Hertz).

Figure 2:
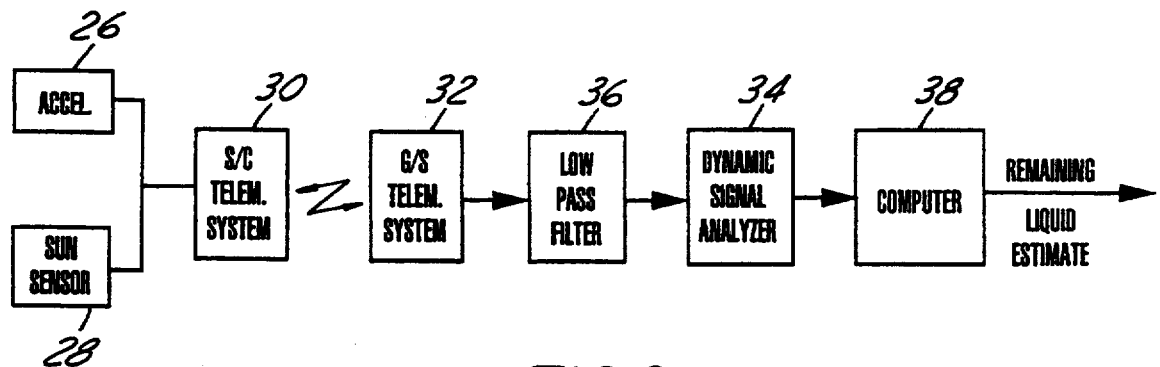
FIG. 2 is a block diagram of the major elements of the apparatus of the present invention for determining the fill fraction of the storage tanks.

A sun (solar) sensor 28 is also mounted on the spacecraft to rotate therewith and sense radiation from the sun. The sun sensor 28 generates a spin frequency reference signal including a pair of pulses each time the spacecraft rotates the sun sensor With reference to FIG. 2 of the drawings, shown is a block diagram of the major elements of the apparatus of the present invention for determining the fill fraction of the storage tanks 16. The accelerometer 26 and the sun sensor 28 are connected to a spacecraft (S/C) telemetering system 30, which receives and combines the accelerometer signal and the spin frequency reference signal to form an analog composite signal. The composite signal is filtered to limit its bandwidth of 0.1 to 10 Hertz and is used to frequency modulate a 14.5 kilohertz subcarrier. The subcarrier is then used to linearly phase modulate a radio frequency telemetry downlink signal.

A ground station telemetering system 32 is disposed on the earth to receive the downlink signal. The downlink signal is downconverted to approximately 70 megahertz and is detected by a telemetry receiver included in the ground station telemetry system 32. The resulting frequency-modulated signal is then detected by a frequency modulation data detector also included in the ground station telemetry system 32, and the resulting composite downconverted signal is provided as an analog voltage.

To determine the fill fraction of propellant 18 in the tanks 16 during flight, a thruster 24 is briefly actuated to introduce sufficient acceleration to produce oscillations of the spacecraft and the tanks 16 attached thereto. Electronic signals representing the oscillations are analyzed and compared with nonempirically generated signals representing oscillations associated with possible fill fractions over a range of interest.

Following the application of an accelerating thrust to produce oscillations of the tanks 16, the resulting composite signal comprises a sum of sinusoidal oscillation constituents, some of which are decaying exponentially. A dynamic signal analyzer 34 is connected to the ground station (S/C) telemetry system 32 to receive the resulting composite signal and to identify its sinusoidal constituents.

The dynamic signal analyzer 34 has a dynamic range of 80 decibels; however, much of this dynamic range is unavailable for accelerometer signal processing unless the sun pulses are attenuated. A sharp, low-pass filter 36 having a cutoff frequency of 2.5 Hertz is connected between the ground station telemetry system 32 and the dynamic signal analyzer 34 to maximize the accelerometer signal within this range. This eliminates higher harmonics of the sun pulses and reduces the peak signal by a factor of approximately eight. The resulting resolution of the data analysis is then less than 0.2 micro-g. This is required after most of the propellant has been expelled and the thrust level is low, e.g., below about one pound of force, and the propellant mass has been reduced below 20 pounds of mass.

The dynamic signal analyzer 34 acquires data and estimates its linear spectrum over a 2.5 Hertz bandwidth with a resolution of 800 lines. A curve-fitting function of the dynamic signal analyzer 34 obtains a multidegree-of-freedom curve fit of the spectrum to identify the spacecraft axial slosh frequency and the nearest harmonic, usually the second, of spin frequency. The accuracy of estimated frequency determination is $\pm 0.1$ percent with typical slosh damping in the range of 0.5 percent of critical.

A computer 38 is connected to the dynamic signal analyzer 34 to receive data therefrom indicating the spacecraft axial slosh frequency. The computer 38 nonempirically (i.e., using a theoretical model) generates signals representing oscillations associated with possible propellant fill fractions to compare with the measured axial slosh frequency. To create the nonempirically generated signals, an approximate numerical solution to linear equations of motion for the rigid spacecraft coupled to the liquid is obtained for a number of fill fractions in the region of interest. The linearized equations are based on a theory in which system equations are formulated with coupled boundary conditions and solved directly. The propellant is modeled as an inviscid, incompressible fluid.

A theoretical model for the linear response of a rigid spacecraft containing an inviscid, incompressible liquid spinning in equilibrium with the spacecraft is first defined. The equations governing the motion of a linear, inviscid and incompressible liquid include the following in terms of liquid relative velocity u, a three-dimensional vector field variable; reduced dynamic pressure P, a scalar field variable; body acceleration G, a three-dimensional vector dependent on the spacecraft rigid body perturbation angular rates $\omega_1$ and velocities V; and accelerations $\partial \omega_1/\partial t$ ($=\partial_t\omega_1$) and $\partial V/\partial t$.

Conservation of momentum: $\partial_t u + 2\Omega k \times u + \nabla p = G$
Conservation of mass: $\nabla \cdot u = 0$
Wall boundary condition: $u \cdot n = 0$
Free surface boundary condition: $\partial_t p = 0$
where:

$u = u(r,t) =$ liquid relative velocity (vector field variable)

$P = P(r,t) = (p/\rho) - (\Omega^2(k \times r)^2/2) + gk \cdot r$ = reduced pressure or acceleration potential (scalar field variable)

$r =$ position vector with respect to spacecraft relative to spacecraft dry center of mass $p =$ liquid pressure $\rho =$ constant liquid density $g =$ thrust acceleration $G = -\partial_t\omega_1 \times r - \omega_1 \times (\Omega \times r) - \Omega \times (\omega_1 \times r) - (\partial_t V + \Omega k \times V)$ $\omega = \omega_1 + \Omega k =$ vehicle rate $\Omega =$ equilibrium spin rate $k =$ unit vector along spin axis $\omega_1 = \omega_1(t) =$ vehicle perturbation angular rates $V = V(t) =$ vehicle perturbation linear velocity For a practical solution of this linear system of equations, the velocity vector field u is eliminated through algebraic manipulation of the conservation of momentum, the conservation of mass, the wall boundary condition and the free surface boundary condition to yield the following in scalar P only and $\omega_1$, V (via G).

Conservation of momentum and mass:
$\nabla^2 \partial_t^2 P + 4\Omega^2 (k \cdot \nabla)^2 P = 0$ Wall boundary condition: $n \cdot L_B(\nabla P - G) = 0$ Free surface boundary condition:
$\partial_t^2(\partial_t^2 + 4\Omega^2)P - (g^2 + r_0^2\Omega^4)^{\frac{1}{2}} n \cdot L_B(\nabla P - G) = 0$ where:

$r_0 =$ free surface radius $g =$ steady thrust acceleration

The spacecraft conservation of linear and angular momentum equations are simply written as follows.

$$M_d(\partial_t V + \Omega k \times V) = \Sigma_i \int_{Sw_i} pn P dS + F_e$$
$$I_d \dot{\omega} + \omega \times I_d \omega = \Sigma_i \int_{Sw} \rho r \times n P dS + T_e$$

where:

$M_d$, $I_d$ = dry rigid body mass and inertia matrix about the dry spacecraft center of mass $S_w$ = wetted wall surface in the tank $F_e$, $T_e$ = external force, torque (i.e., excluding liquid induced component)

The solution to the foregoing equations is approximated by the solution to a finite system of coupled first order ordinary differential equations using a numerical finite element method. In this formulation, the state variables are the dynamic pressure P; the first rate of change of P, $\partial P/\partial t$ at each node in the liquid finite element mesh; the second and third rates of change of P, $\partial^2 P/\partial t^2$ and $\partial^3 P/\partial t^3$ respectively, at each free surface node; the rigid body angular rate $\omega_1$; the first and second rates of change of angular rate, $\partial \omega_1/\partial t$ and $\partial^2 \omega_1/\partial t^2$, respectively, and the first and second rate of change of linear velocity $\partial V/\partial t$ and $\partial^2 V/\partial t^2$, respectively. The Galerkin method of weighted residuals is used to enforce simultaneously the conservation of momentum and mass and the wall boundary and free surface boundary conditions. The solution of this method has been shown to converge to the known theoretical values for a cylindrical tank as the finite element mesh is refined.

Figure 3:
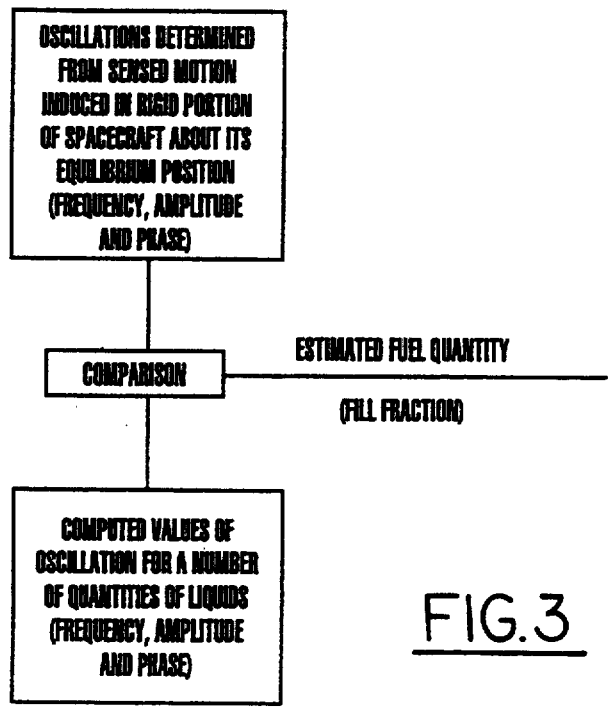
FIG. 3 is a diagram illustrating the function of comparing measured and nonempirically computed oscillation values to obtain a remaining fuel quantity estimate.

To determine propellant fill fraction, the rigid body responses $\omega_1$ and V for known disturbance inputs $T_e$ and $F_e$ are predicted for a number of possible fill fractions over a range of interest (to the desired degree of accuracy) and compared to the corresponding sensed response of the rigid body. FIG. 3 illustrates the basic process. The quantity of liquid is determined by fill fraction based on known tank volume and liquid density.

For immediate end-of-life applications when the ratio of liquid to rigid mass is less than 0.1, it is reasonable to use a synthesized solution to system equations based on liquid modes of vibration identified from a time simulation. This synthesis assumes that liquid flow motion under prescribed container motion is equivalent to that under coupled spacecraft conditions so that an equivalent dynamic mass transfer function $M_{Lz}(s)$ can be identified from the simulated liquid axial reaction force response $f_z$ and known prescribed tank motion. Restricting the spacecraft to axial motion, or making the common assumption for small liquid fractions that translation and rotation dynamics are decoupled, the system equations reduce to the following.

$$M_d s V_z(s) = -n M_{Lz}(s) sV_z(s) + F_{ez}$$

where:

$$M_{Lz}(s) = m_L - \frac{s^2 m_e}{(S^2 + \omega_e^2)} = -\int_{sw_i} \frac{\rho n P(s) ds}{sV_z(s)}$$

Figure 4:
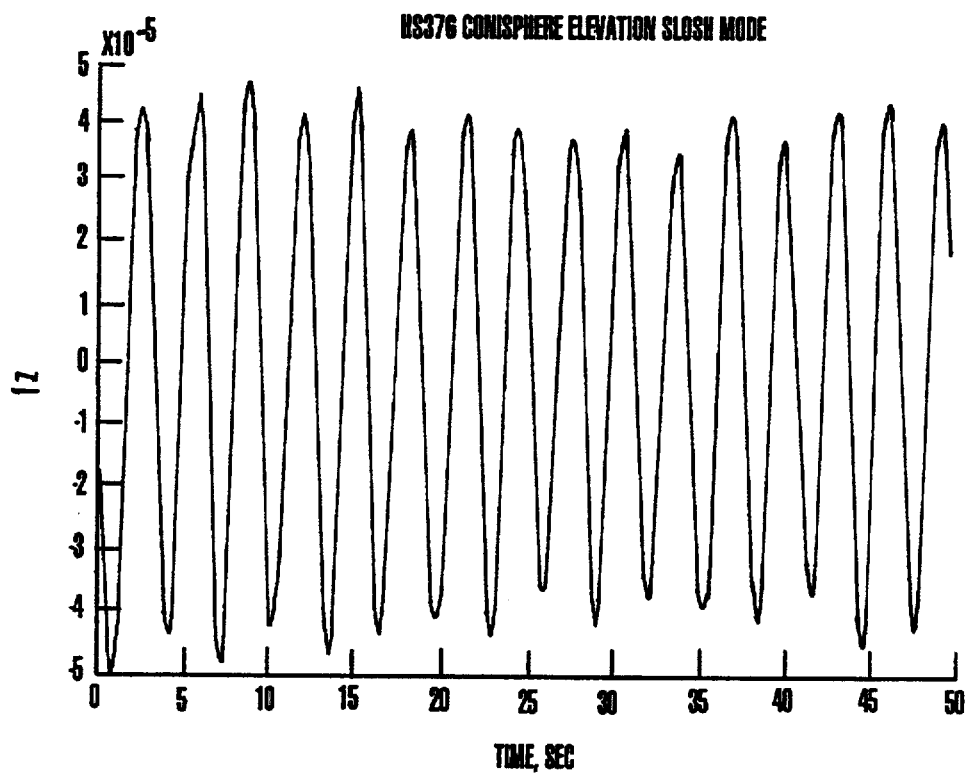
FIG. 4 is a graphic representation of a typical simulated response of liquid axial reaction force to a short acceleration pulse with respect to time.
Figure 5:
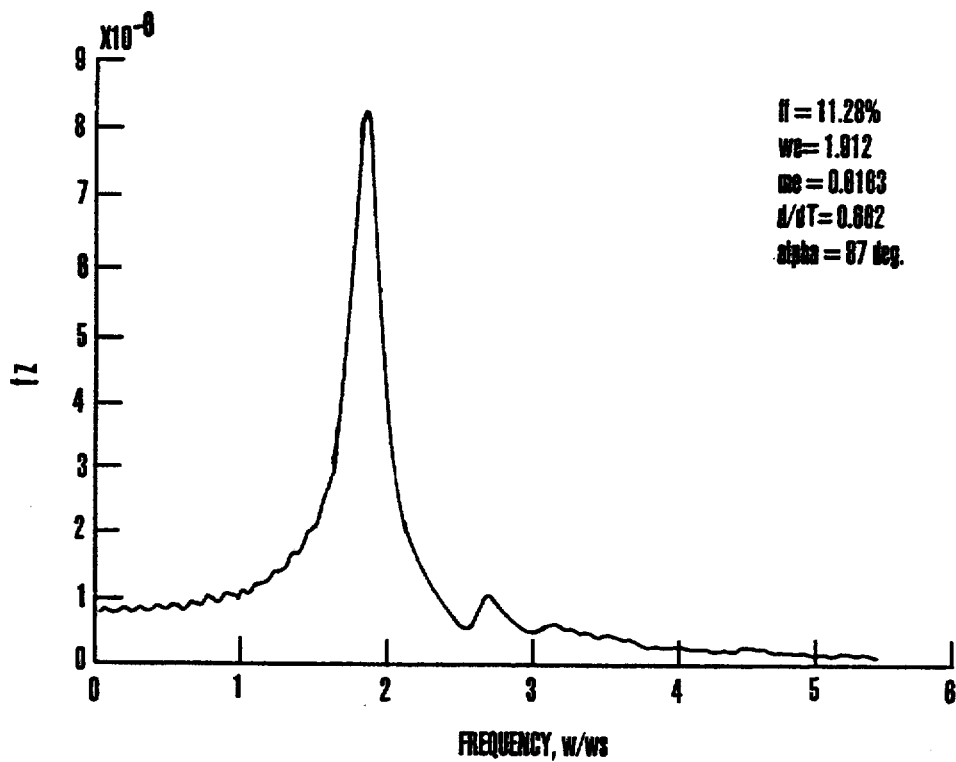
Figure 5 is a graphic representation of a typical simulated response of liquid axial reaction force to a short acceleration pulse with respect to normalized axial slosh frequency.

$sV_z(s)$ = spacecraft inertial axial perturbational accel $m_L$ = total liquid mass/tank $\omega_e$, $m_e$ = identified liquid modal frequency and mass $F_{ez}$ = total axial thruster force n = number of tanks A typical simulation response for the liquid axial reaction force $f_z$ for an applied short (0.2-second) constant acceleration pulse is shown in FIG. 4 with a linear spectrum of the time record, after t=0.2 seconds, taken with an extended resolution fast Fourier transform with exponential windowing. In the example shown by FIG. 5, the normalized axial slosh frequency $\omega_e$ is 1.912; and the modal mass is 0.6163 $m_L$. Approximately 15 cycles of simulation are required to obtain a slosh frequency that is converged within ±0.1 percent. The spatial resolution of the analysis mesh is successively refined until the determined frequency is converged within ±0.1%. The analysis is repeated until a sufficient density of points are obtained in the vicinity of the fill fraction of interest. With estimated liquid modal mass and frequency and known dry spacecraft mass and total liquid mass, the previous equation is solved to predict the spacecraft axial slosh frequency, $$\omega_e^* = \omega_e / \sqrt{1 - nm_e/(m_d + nm_L)}$$

Figure 6:
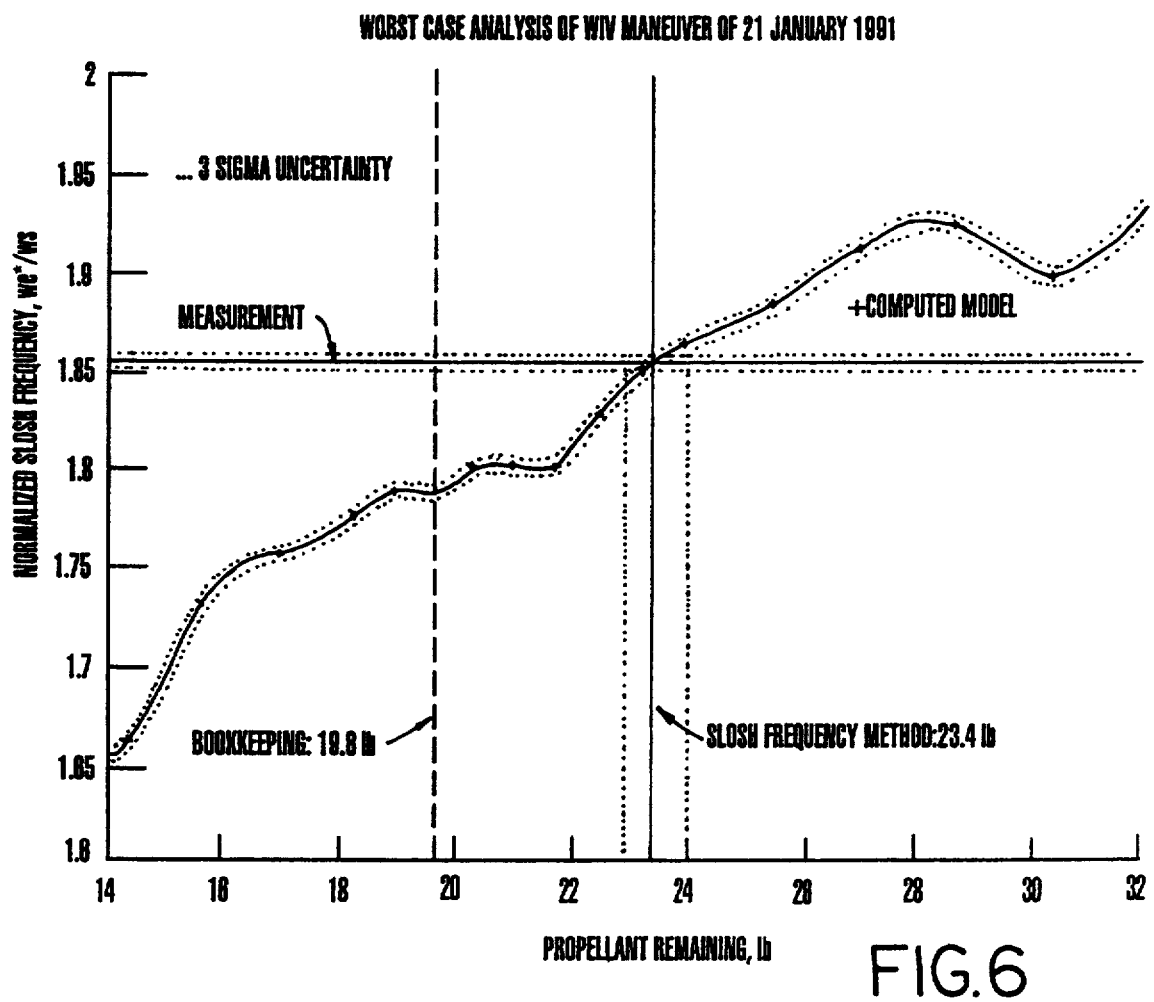
FIG. 6 is a graphic representation of a comparison of the predicted normalized axial slosh frequency with respect to the total mass of liquid remaining.

A graphical method is used to compare the measured spacecraft axial slosh frequency (normalized) with the predicted frequency fill fraction, or total propellant mass remaining. This is based on a 100 percent fill fraction corresponding to 364 pounds of propellant mass and is illustrated by FIG. 6. In this case, the estimate of propellant remaining is 23.4 pounds of propellant mass. As indicated, a bookkeeping method, that is, a method based on keeping track of accumulated thruster actuation time, measurements of tank gas pressure, and ground calibration of thruster flow rate versus tank pressure, resulted in an estimate of 19.8 pounds of propellant mass remaining. Estimated measurement and prediction errors are also indicated.

Those skilled in the art will recognize that many variations can be made to the apparatus for determining liquid fill fraction on a spacecraft without departing from the scope of the invention; for example, the tanks 16 can be rigidly mounted on a platform that is free to rotate relative to the spacecraft. Also a different number of axisymmetrically disposed tanks 16 can be used. Also, other spacecraft actuators and sensors can be used such as electric despin motors and gyros and other spacecraft oscillatory responses can be predicted such as rotation rate.

While the best mode for carrying out the invention has been described in detail, those familiar with the art to which this invention relates will recognize various alternative designs and embodiments for practicing the invention as defined by the following claims.

What is claimed is:

1. An apparatus for determining the volume of a liquid contained within at least two rigid tanks disposed within a spacecraft, the tanks revolving about an axis about which they are rigidly and axisymmetrically disposed, the apparatus comprising:

predicting means for nonempirically predicting, for a number of possible quantities of liquid in the tanks, frequency, amplitude and phase oscillatory constituents of the spacecraft resulting from a small acceleration about its equilibrium position;

actuating means for applying force or torque to the spacecraft to produce the relatively small acceleration;

measuring means for measuring frequency, amplitude and phase oscillatory constituents resulting from the relatively small acceleration of the spacecraft; and comparing means for comparing the predicted frequency, amplitude and phase oscillatory constituents with those measured, a match thereby identifying the quantity of liquid in said tanks.

2. The apparatus as defined by claim 1, further including sun sensing means disposed on the spacecraft for sensing the presence of sunlight and generating a spin frequency reference signal representative of the rate of revolution of said tanks.

3. The apparatus as defined by claim 2, wherein said tanks are revolving about the axis at an angular velocity within a range of 45 to 65 revolutions per minute.

4. The apparatus as defined by claim 2, wherein the predicting means includes a computer that nonempirically computes, according to a computed model of spacecraft dynamics and for said number of possible quantities of liquid in said tanks, said predicted frequency, amplitude and phase oscillatory constituents generated by the relatively small acceleration about the equilibrium position of the spacecraft.

5. The apparatus as defined by claim 4, wherein said actuating means includes means disposed on the spacecraft for releasing, under the influence of tank pressure and in a direction parallel to the axis, a controlled amount of liquid stored in said tanks.

6. The apparatus as defined by claim 5, wherein the measuring means includes an accelerometer disposed on the spacecraft for measuring said measured frequency, amplitude and phase oscillatory constituents resulting from the acceleration of said tanks and generating an oscillation signal representative thereof.

7. The apparatus as defined by claim 6, wherein the accelerometer has a resolution limit less than 1 micro-g, a sensitivity in the range of 3 to 10 volts per g, and a bandwidth of 0 to 60 Hertz.

8. The apparatus as defined by claim 6, further including analyzing means for analyzing the oscillation signal to determine the measured frequency, amplitude and phase oscillatory constituents represented by the oscillation signal.

9. The apparatus as defined by claim 8, wherein the analyzing means includes a dynamic signal analyzer.

10. The apparatus as defined by claim 9, wherein the dynamic signal analyzer has a dynamic range from 60 to 100 decibels; estimates the linear spectrum of acquired data over a 2.5 Hertz bandwidth with a resolution of 800 lines; and has an accuracy of estimated frequency determination of ±0.1 percent with typical slosh damping in the range of 0.5 percent of critical.

11. The apparatus as defined by claim 8, wherein said computer includes said comparing means for comparing the measured frequency, amplitude and phase oscillatory constituents represented by the oscillation signal with those predicted and generating a signal representative of the quantity of liquid associated with the predicted frequency, amplitude and phase oscillatory constituents that match those measured.

12. The apparatus as defined by claim 11, further comprising:
a spacecraft telemetry system for receiving the oscillation signal and the spin frequency reference signal and generating in response thereto a composite telemetry downlink signal; and
a ground station telemetry system for receiving the composite telemetry downlink signal and generating in response thereto a composite downconverted signal.

13. The apparatus as defined by claim 12, further including a sharp, low-pass filter for filtering the composite downconverted signal from the ground station telemetry system and communicating it to the dynamic signal analyzer.

14. The apparatus as defined by claim 13, wherein the sharp, low-pass filter has a cutoff frequency of 2.5 Hertz.

15. A method for determining the volume of a liquid contained within at least one pair of rigid tanks disposed within a spacecraft, the tanks revolving about an axis about which they are rigidly and axisymmetrically disposed, the method comprising the steps of;
predicting nonempirically, for a number of possible quantities of liquid in the tanks, frequency, amplitude and phase oscillatory constituents of the spacecraft to a small acceleration about its equilibrium position;
applying a force to the spacecraft to produce the relatively small acceleration thereof;
measuring frequency, amplitude and phase oscillatory constituents resulting from the relatively small acceleration of the spacecraft; and
comparing the predicted frequency, amplitude and phase oscillatory constituents with those measured, a match thereby identifying the quantity of liquid in the tanks.

16. The method as defined by claim 15, further including the step of generating an oscillation signal representative of the measured frequency, amplitude and phase oscillatory constituents.

17. The method as defined by claim 16, further including the step of analyzing the oscillation signal to determine the measured frequency, amplitude and phase oscillatory constituents represented by the oscillation signal.

18. The method as defined by claim 17, further including the step of generating a fill fraction signal representative of the quantity of liquid associated with the predicted frequency, amplitude and phase oscillatory constituents that match those measured.

* * * * *